Dec. 30, 1958  F. X. LAMB  2,866,940
ELECTRICAL INSTRUMENT CASING
Filed April 2, 1954
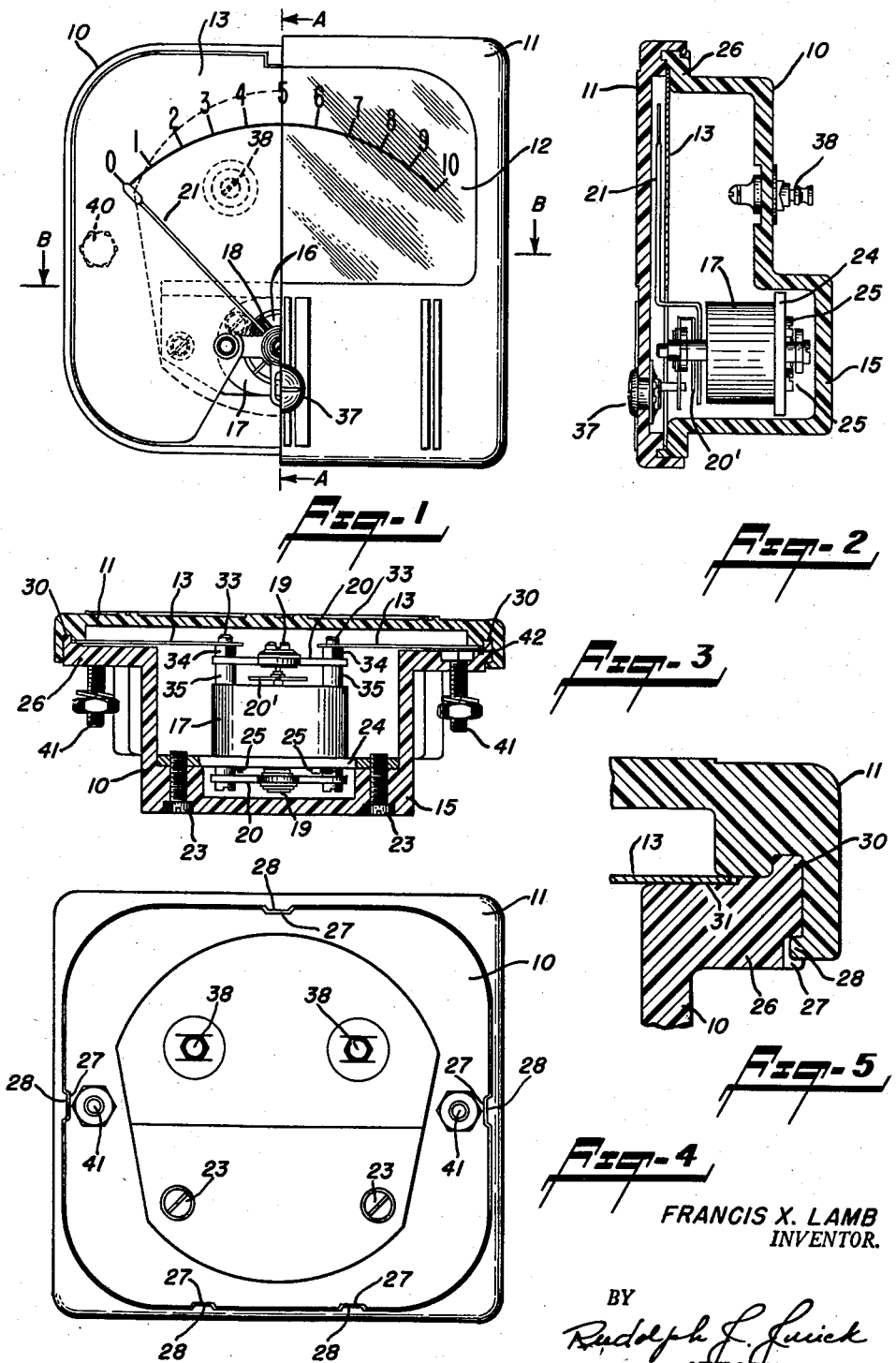
FRANCIS X. LAMB
INVENTOR.
BY Rudolph J. Jurick
ATTORNEY United States Patent Office 2,866,940
Patented Dec. 30, 1958

2,866,940

ELECTRICAL INSTRUMENT CASING

Francis X. Lamb, East Orange, N. J., assignor, by mesne assignments, to Daystrom, Incorporated, Murray Hill, N. J., a corporation of New Jersey Application April 2, 1954, Serial No. 420,717

9 Claims. (Cl. 324—156)

This invention relates to electrical instruments and more particularly to a housing for instruments such as voltmeters, ammeters and the like.

Instruments of the class contemplated by this invention generally comprise a case within which is mounted the instrument mechanism and a transparent cover through which the scale of the instrument is visible. In accordance with present practice, the scale plate, which carries a suitably graduated scale, generally is secured to the instrument mechanism, particularly the instrument bridge posts. Ordinarily, the glass window of such instrument is secured to the cover by a separate bezel or snap ring and the cover is secured to the base by a plurality of screws threaded into cooperating metal inserts molded into the plastic case. In any event, instrument housings made in accordance with the prior art involve numerous separate parts which must be manufactured to fairly close tolerances. The cost of producing such parts and assembling them adds materially to the overall cost of the instrument without reflecting any advantages with respect to the operation or functioning of the device.

An instrument housing made in accordance with my invention eliminates the necessity for the usual screws, bezels, inserts, studs, washers, etc., thereby affording a degree of manufacturing economy heretofore not possible.

An object of this invention is to provide a simplified instrument housing construction requiring a minimum number of component parts and which reduces significantly the material and labor expense in connection with the manufacture of the instrument.

An object of this invention is the provision of an instrument housing in which the cover is made of a transparent plastic and is secured to the case without the use of screws.

An object of this invention is the provision of an instrument of the type including a scale plate and in which the scale plate is secured in fixed position without the use of conventional, separate, fastening means.

An object of this invention is the provision of a flush type instrument housing of the type comprising a cup-shaped case and a transparent cover and wherein the screws for mounting the instrument on a panel do not pass through the cover.

More specifically, it is an object of this invention to provide an electrical instrument comprising a cup-shaped case in which the operating mechanism is mounted, a transparent cover that is secured to the case by snap-action means forming an integral part of the cover, a scale plate that is secured in position by a clamping action of the cover against a ledge provided in the case, and mounting screws for fastening the instrument to a panel, said screws being removable from the instrument only upon removal of the cover from the case.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

Figure 1 is a front view of the instrument with a portion of the cover removed;

Figure 2 is a vertical section taken along the line A—A of Figure 1, but with the instrument mechanism shown in elevation for purposes of clarity;

Figure 3 is a horizontal section taken along the line B—B of Figure 1;

Figure 4 is a rear view of the instrument; and

Figure 5 is a fragmentary, enlarged sectional view to illustrate the snap-acting means by which the cover is secured to the case and the clamping of the scale plate between the cover and the flange of the case.

The instrument housing comprises the cup-shaped case 10, made of a suitable plastic, and the cover 11, said cover being made of a transparent plastic. In practice it is preferable to coat the outer surface of the cover with an opaque paint, leaving only a generally rectangular area 12 which serves as a window through which is visible the entire operating range of the calibrated scale carried by the scale plate 13. The case 10 includes a recessed portion 15 in its bottom or inner wall for accommodating the instrument mechanism. I here show a core-magnet type mechanism comprising a transversely charged, cylindrical permanent magnet 16, spaced from a cylindrical, soft-iron yoke 17. A wire-wound movable coil 18 is pivoted for rotation in the magnetic flux gap established between the magnet core and the yoke, said coil being provided with conventional, alined pivots operating in the bearings 19 carried by the bridges 20. Current is conducted to the movable coil through a pair of spiral springs, such as the top spring 20' visible in the drawings, whereby the pointer 21 moves along the calibrated scale, as is well known in this art.

The specific type of instrument mechanism forms no part of the present invention and it is here pointed out that any type of direct current or alternating current mechanism may be disposed within my novel instrument housing. Such mechanism will be secured in fixed position within the case by any suitable means. In the illustrated arrangement, the mechanism is secured in position by the screws 23 passing through holes provided in the bottom of the case and into appropriate threaded holes formed in a mounting plate 24 to which the mechanism is secured as by the screws 25.

The case 10 includes an integral flange 26, outwardly-extending from its side walls and provided with a plurality of recesses or notches 27, opening in the direction of flange projection and terminating at shoulders facing in a direction toward the plane of the bottom wall of the case and lying in a plane spaced toward said bottom wall plane a predetermined distance from the plane of the open end of said case, such notches being best shown in Figures 4 and 5. It will be noted that the notches are positioned in the flange 26 about the periphery, and spaced a predetermined distance from the plane of the open end of the case and on the under side of the flange. It is preferable that at least one notch be formed on each of the four straight sides of the flange sides, two of such notches being here shown in one side, equally spaced on opposite sides of the central plane in which lies the notch on the opposite side. The integral, depending side wall or walls of the cover 11 include a plurality of inwardly-directed lips 28 corresponding in location and size with the notches formed in the case flange. It is here pointed out that the dimensions of the cover are such that the side walls of the cover non-rotatably fit fairly snugly over the flange of the case and it will be apparent that when the cover is positioned over the case pressure exerted to force these members together will cause the cover lips 28 to snap over and then under the flange notches 27. Such arrangement, by virtue of the positioning of the lips at a corresponding location, that is, at a distance from the plane of engagement with the open end of the case corresponding with the predetermined positioning of the case notches, holds the cover securely fastened to the case without the need of fastening screws and yet the cover can be removed by merely prying the cover upwardly in the region of one or more of the lips. It is believed the lip-notch arrangement is best understood by reference to the fragmentary sectional view of Figure 5. In this view it will be seen that the cover lip 28 does not extend inwardly the full depth of the flange notch 27. Consequently, when the cover 11 is snapped into position on the case the cover is not subjected to radial stresses at the lips and, therefore, the cover remains securely fastened to the case.

Extending completely around and framing the case flange 26 is an integral ridge 30 which fits snugly within a corresponding groove provided in the side wall of the cover. Thus, when the cover is snapped into position on the case these two parts are not subject to relative angular displacement, especially as the lips and notches lie on straight sides of the respective parts, rather than on arcuate portions. Further, and as will best be understood by reference to Figure 5, that portion of the flange 26 which forms a continuation of the inner wall of the case is of a reduced longitudinal thickness thereby forming a ledge 31. Such ledge extends completely around the flange and is so shaped that it will accommodate the scale plate 13. Hence, the scale plate rests peripherally upon the ledge and is clamped between the flange and the cover when the latter is snapped into position over the case. While the peripheral contour of the scale plate can be made to correspond exactly with that of the flange ledge to thereby properly and positively orient the graduated scale with respect to the rotational axis of the instrument movable coil, I prefer to allow some clearance between the scale plate periphery and the wall defining the flange ledge and to orient, or index, the scale by fixed means associated with the instrument mechanism. I do this by providing reduced diameter and slightly rounded extensions 33 formed as pins integral with the screws 34 which secure the upper bridge 29 to the bridge posts 35. These extensions pass through close fitting holes formed in the scale plate 13. Inasmuch as these holes can be positioned precisely, as by a punching operation or by the use of a suitable drill jig, it will be apparent that the arc of the graduated scale, carried by the scale plate, will have its center coinciding exactly with the pivot axis of the movable coil.

In accordance with conventional practice, the instrument is provided with a zero adjuster screw 37 rotatably secured to the instrument cover and having a pin projecting into a slot formed in the abutment to which the outer convolution of the upper spiral spring is soldered. Current is conducted to the movable coil winding by a pair of leads connected to the terminals 38 which are molded directly in the bottom wall of the case.

Instruments of the type described are designed for panel mounting. Generally, this is done by means of suitable screws passing through alined holes provided in the cover and case flange. In the present construction, however, I mold two hexagonal and diametrically-opposed bores 40 on the transverse center line of the instrument housing. These bores have a depth somewhat greater than the thickness of the hexagonal head of the mounting screws 41 which pass through suitable holes in the case flange. When the mounting screws are assembled into position, a piece of insulating tape 42, or other suitable material, is placed over the screw heads to thereby electrically isolate the screws and the metal scale plate. The cover 11 overlies the scale plate 13, tape 42, and parts of the heads of the screws 41, thereby holding said heads in the bores 40.

From the above description of my invention, the features and advantages of my novel instrument housing construction will be apparent. The housing proper consists of two parts, the case and the cover. Metallic inserts which normally impede molding time and increase cost are eliminated completely. The cover is a combined cover and window molded in one piece of transparent plastic and is secured to the case without the use of screws. The screws for mounting the instrument on a panel are merely dropped into molded recesses and cannot become lost. The instrument scale plate, or dial, is clamped between the cover and the case flange thereby eliminating the necessity for fastening screws, lock washers, etc. Aside from the cost savings realized in the elimination of many parts now required in the manufacture of instruments of this type, there is a substantial saving in the actual assembly time of the instrument.

Having now described my invention in detail, those skilled in this art will find no difficulty in making certain changes and modifications to meet desired or required conditions specific to particular instruments or their intended use. Such changes and modifications may be made without departing from the scope and spirit of the invention as recited in the following claims.

I claim:

1. A housing for an electrical instrument comprising a cup-shaped case having a bottom wall, side walls extending upwardly therefrom, an integral flange at its open end, projecting laterally from and beyond the outer surfaces of said side walls, said flange having a plurality of notches formed in its outer peripheral surface, opening in said direction of flange projection, terminating at shoulders facing in a direction toward the plane of the bottom wall, and lying in a plane spaced toward said bottom wall plane a predetermined distance from the plane of the open end of the case; and a cover made of a plastic material and including a depending side wall closely encircling the peripheral surface of the flange, said cover side wall having a plurality of integral, inwardly-directed lips positioned thereon and with locking shoulders at a distance from the plane of cover engagement with the open end of the case corresponding with the spacing of the plane of said notch shoulders to fasteningly extend directly into the flange notches, so that when said cover is applied its wall lips are forced into resilient engagement in the cooperating flange notches.

2. The invention as recited in claim 1 including a set of bores formed in the said flange, said bores communicating with holes passing through the flange; and mounting screws having heads disposed within the said bores, held therein by said cover, and shanks extending through the flange holes.

3. In a housing for an electrical instrument, a cup-shaped case including an integral, outwardly-directed flange at the open end, an integral ridge framing the flange; an instrument mechanism mounted in and supported by the case; a cover made of a transparent plastic and non-rotatably resting upon the flange and with a groove in its side wall snugly receiving said ridge, a portion of the side wall of the cover encircling the peripheral surface of the flange; means securing the cover to the flange, with the ridge and groove arrangement inhibiting angular displacement; and a scale plate peripherally clamped between the flange and the cover.

4. The invention as recited in claim 3 wherein the means securing the cover to the flange comprises a plurality of integral, inwardly-directed lips on the side wall of the cover, said lips extending into cooperating notches formed in the adjacent peripheral wall of the flange, said lips and notches being correspondingly positioned so that the cover is thereby fastened to the flange.

5. The invention as recited in claim 3 wherein the scale plate includes a set of locating holes, and including pins carried by the mechanism and extending through the plate holes.

6. The invention as recited in claim 3 wherein the flange includes a pair of diametrically-opposed holes terminating in enlarged bores adjacent the cover, and including mounting screws having heads disposed within the said bores and shanks passing through the flange holes.

7. In an electrical instrument the combination of a cup-shaped case made of a plastic material and including an outwardly-directed flange at the open end, the outer peripheral edge of which includes two sets of generally parallel straight portions defining an approximate rectangle; an instrument mechanism mounted in and supported by the case; a scale plate peripherally supported on the radial surface of the flange; a dish-shaped cover made of a transparent plastic material closing the case, a portion of the cover side wall engaging the scale plate and another portion of the side wall encircling the outer peripheral surface of the flange, and said cover being non-rotatably fastened to the case by means of a plurality of inwardly-directed lips formed on the said other portion of the cover side wall and extending into cooperating notches formed in the adjacent peripheral surface of the flange, one of said notches being at each of three of the straight portions and two of said notches being at the other straight portion, equally spaced on opposite sides of the central plane in which lies the notch at the opposite side.

8. The invention as recited in claim 7 wherein the flange includes a pair of diametrically-opposed holes terminating in enlarged bores proximate to the scale plate; and including mounting screws having heads disposed within the said bores and shanks extending through the flange holes.

9. The invention as recited in claim 7 wherein the scale plate includes a set of locating holes, and including pins carried by the mechanism and extending through the scale plate holes.

References Cited in the file of this patent

UNITED STATES PATENTS

| | | |
|---|---|---|
| 2,206,437 | Tracy | July 2, 1940 |
| 2,315,587 | Bradshaw | Apr. 6, 1943 |
| 2,422,714 | Bigelow | June 24, 1947 |
| 2,576,583 | Emery | Nov. 27, 1951 |
| 2,581,734 | Triplett | Jan. 8, 1952 |
| 2,612,132 | Triplett | Sept. 30, 1952 |
| 2,704,349 | Sheehan | Mar. 15, 1955 |